UNITED STATES PATENT OFFICE.

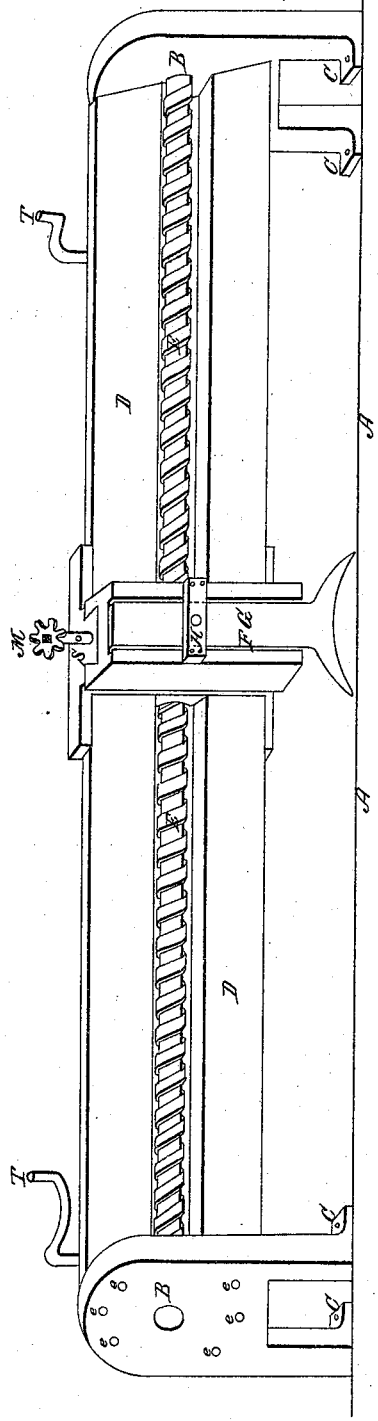

JONAH ELLIS, OF NEAR WARRINGTON, COUNTY OF LANCASTER, ENGLAND.

IMPROVEMENT IN MACHINES FOR QUARRYING STONE, &c.

Specification forming part of Letters Patent No. 23,667, dated April 19, 1859.

*To all whom it may concern:*

Be it known that I, JONAH ELLIS, a native of the Kingdom of Great Britain, in the County of Lancaster, near Warrington, have invented a new and Improved Machine for the Purpose of Cutting Blocks of Stone, Slate, Coal, Salt Rock, or other Materials or Minerals, by which I am enabled to quarry the same at a great saving of expense and time and also at a saving of material, and in any position in which the quarry may lie, by means of a tool or cutter which is made to traverse along a bed-plate, cutting a seam or channel in the rock or other mineral at any required depth and at any angle, the machine to be worked by steam or any other power which the operator may choose to make use of, and after the seam has been cut the bed-plate can be moved to any other convenient position for making another cut or seam, the seams being cut to any required depth or length; and I do hereby declare that the following is a full and exact description thereof, reference being had to the accompanying drawings and the letters of reference marked thereon.

The nature of my invention consists in a portable apparatus designed for expediting the quarrying of rock or other mineral substances by cutting grooves in the material at right angles to each other or to the stratification of the rock, the said grooves terminating in holes previously drilled in the rock and which form the extremities of the proposed cut, as will be explained.

To enable others skilled in the art to make and use my invention, I will proceed to describe its construction and operation by reference to the drawing, which represents a perspective view of the machine.

A A is the rock in which the seam or joint is required to be cut.

B B are the cheeks or end frames, the feet of which C C are securely bolted to the rock.

D D is the slide or bed-plate; E E, the screw in slide for moving rest F, and G a cutter in rest oscillating on point H.

The pulleys are not shown in the drawing, as they are too well known to need any description. They may be used or either bevel, miter, or straight-toothed gearing, as may be desirable.

M M are tappets fixed on head of rest-screw O, to raise or lower cutters; S, cross-head for rest-screw; T T, arms affixed to slide to act on tappets on cross-head rest-screw and send the cutter downward, and *e e e e e e* set-screws to admit of the cutter being turned so as to present it to the rock at any required angle.

When this machine is brought into action it is necessary that two holes—say one or one and a half inches in diameter—be sunk in the rock at the extremities of the proposed cut and to the depth required. The machine is then fixed by bolts through the feet, so as to bring the cutter precisely over the line extending from one hole to the other. Power is then applied by means of steam or other power and the motion obtained by the use of belts or otherwise, as may be desired, and the cutting proceeds. If a cut of only six or nine inches in depth is required, no change of cutter is necessary; but when deeper cuts are required it is desirable to use several cutters of various degrees of thickness, the thickest being always used first.

By using a series of four cutters—the first one-half inch in thickness, the second seven-sixteenths, the third three-eighths, and the fourth five-sixteenths or one-fourth inch in thickness—a cut may be made three feet in depth.

The cutter is intended to oscillate on the pin H or on a pin or pivot placed higher or lower on the rest, as may be found desirable, and to cut alternately with its two points; or the purpose may be accomplished by using a rest fitted with two screws and two cutters, so that the tappets at either end of the slide might act on the two screws and corresponding cutters alternately, and also, though in the drawings I have made use of the screw as the instrument for moving the rest on the slide, I can also obtain the same motion by the use of the rack and pinion, the worm, or the chain motion.

Having thus fully described the nature and object of my invention, I would state that I lay no claim to the parts herein described when taken separately; but

What I do claim as new, and desire to secure by Letters Patent, is—

A portable apparatus designed for cutting grooves in rock or other mineral substances for the purpose of quarrying the same in blocks, and consisting of supports B B, which are fastened to the rock and sustain an adjustable bed-plate D and screw-shaft E, upon which bed-plate and screw-shaft a tool-stock and adjustable cutter is made to traverse between two previously drilled or opened spaces which form the extremities of the proposed cut, substantially as herein described and represented.

JONAH ELLIS.

Witnesses:
  JOHN ROSS,
  E. W. BROWN.